(12) United States Patent
Jiang et al.

(10) Patent No.: US 10,848,365 B2
(45) Date of Patent: Nov. 24, 2020

(54) SYSTEM AND METHOD FOR HYBRID TRANSMITTER

(71) Applicant: Futurewei Technologies, Inc., Plano, TX (US)

(72) Inventors: Hong Jiang, Kernersville, NC (US); Zhihang Zhang, Cary, NC (US); Jamil Mark Forrester, Summerfield, NC (US); Wael Al-Qaq, Oak Ridge, NC (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/450,581

(22) Filed: Jun. 24, 2019

(65) Prior Publication Data

US 2019/0386868 A1 Dec. 19, 2019

Related U.S. Application Data

(63) Continuation of application No. 16/011,287, filed on Jun. 18, 2018, now Pat. No. 10,333,763.

(51) Int. Cl.
*H04L 27/36* (2006.01)
*H04L 27/00* (2006.01)
*H04B 1/04* (2006.01)

(52) U.S. Cl.
CPC ......... *H04L 27/364* (2013.01); *H04B 1/0475* (2013.01); *H04L 27/0014* (2013.01);
(Continued)

(58) Field of Classification Search
CPC ............... H04L 27/364; H04L 27/0014; H04L 2027/0018; H04L 2027/0083;
(Continued)

(56) References Cited

U.S. PATENT DOCUMENTS 6,285,251 B1 * 9/2001 Dent .................... H02M 3/1582
330/124 R
2003/0048834 A1 * 3/2003 Feher ...................... H04L 1/205
375/219

(Continued)

FOREIGN PATENT DOCUMENTS

CN 103675767 A 3/2014
WO 2004047285 A1 6/2004

*Primary Examiner* — Kabir A Timory
(74) *Attorney, Agent, or Firm* — Slater Matsil, LLP

(57) ABSTRACT

According to one aspect of the present disclosure, there is provided a device that includes: a first quadrature modulator configured to receive an in-phase portion of a baseband signal and a quadrature portion of the baseband signal, and to produce a first portion of an output signal according to the in-phase and quadrature portions of the baseband signal; a second quadrature modulator configured to receive a first modified signal and a second modified signal, and to produce a second portion of the output signal according to the first and second modified signals; an output circuit configured to sum the first and second portions of the output signal, and to transmit the output signal to an antenna; and a mode selection circuit configured to turn on the first quadrature modulator, to receive a control signal, and to determine whether to turn on the second quadrature modulator according to the control signal.

20 Claims, 9 Drawing Sheets

(52) U.S. Cl.
CPC ............... *H04L 2027/0018* (2013.01); *H04L 2027/0083* (2013.01)

(58) Field of Classification Search
CPC ..... H04L 5/0091; H04L 5/0053; H04L 27/20; H04L 27/34; H04B 1/0475
See application file for complete search history.

(56) References Cited

U.S. PATENT DOCUMENTS

2015/0117565 A1   4/2015  Sorrells et al.
2018/0324794 A1  11/2018  Baldemair et al.

* cited by examiner

SYSTEM AND METHOD FOR HYBRID TRANSMITTER

PRIORITY CLAIM

This application is a continuation of U.S. patent application Ser. No. 16/011,287, filed Jun. 18, 2018, entitled "System and Method for Hybrid Transmitter," which application is hereby incorporated herein by reference.

TECHNICAL FIELD

The present disclosure relates generally to a system and method for a transmitter, and, in particular embodiments, to a system and method for a hybrid transmitter.

BACKGROUND

In modern cellular devices, high transmitter linearity helps avoid interference between nearby devices. Specific levels of transmitter linearity may be required by certain standards or governing bodies. For example, the 3rd Generation Partnership Project (3GPP) imposes stringent counter-intermodulation (CIM) requirements. Some types of transmitters may meet new CIM requirements better than other types. For example, such CIM requirements may be met with, e.g., a multi-phase transmitter design. A multi-phase transmitter is sometimes referred to as "N-phase" transmitter, where N is an integer number. Such transmitters implement N transmission paths to generate an up-converted output signal. A 4-Phase transmitter is sometimes referred to as a differential quadrature transmitter, but higher-level phased transmitters, such as 8-Phase transmitters, may also be used.

SUMMARY

According to one aspect of the present disclosure, there is provided a device that includes: a first quadrature modulator configured to receive an in-phase portion of a baseband signal and a quadrature portion of the baseband signal, and to produce a first portion of an output signal according to the in-phase and quadrature portions of the baseband signal; a second quadrature modulator configured to receive a first modified signal and a second modified signal, and to produce a second portion of the output signal according to the first and second modified signals; an output circuit configured to sum the first and second portions of the output signal, and to transmit the output signal to an antenna; and a mode selection circuit configured to turn on the first quadrature modulator, to receive a control signal, and to determine whether to turn on the second quadrature modulator according to the control signal.

Optionally, in any of the preceding aspects, another implementation of the aspect provides that the mode selection circuit is configured to be coupled to a controller, the controller configured to receive parameters of a transmission, and to produce the control signal according to the parameters of the transmission, where the parameters of the transmission include a current resource block configuration of the transmission, a current transmission power of the transmission, and an operating band of the transmission. Optionally, in any of the preceding aspects, another implementation of the aspect provides that the mode selection circuit is further configured to: refrain from turning on the second quadrature modulator in response to the current resource block configuration being in the center of a channel for the transmission. Optionally, in any of the preceding aspects, another implementation of the aspect provides that the mode selection circuit is further configured to: turn on the second quadrature modulator in response to the current resource block configuration being at the edge of a channel for the transmission. Optionally, in any of the preceding aspects, another implementation of the aspect provides that the mode selection circuit is further configured to: determine a threshold transmission power according to the operating band of the transmission; and refrain from turning on the second quadrature modulator in response to the current transmission power of the transmission being less than or equal to the threshold transmission power. Optionally, in any of the preceding aspects, another implementation of the aspect provides that the threshold transmission power is determined using a lookup table indexed by the operating band. Optionally, in any of the preceding aspects, another implementation of the aspect provides that the output circuit includes an amplifier configured to amplify the output signal before transmission to the antenna. Optionally, in any of the preceding aspects, another implementation of the aspect provides that the device further includes: a compensation and correction module, the compensation and correction module configured to modify the baseband signal, the mode selection circuit configured to change parameters of the compensation and correction module according to the control signal. Optionally, in any of the preceding aspects, another implementation of the aspect provides that the compensation and correction module is configured to compensate a phase of the baseband signal according to whether the second quadrature modulator is turned on. Optionally, in any of the preceding aspects, another implementation of the aspect provides that the compensation and correction module is configured to correct impairment of the baseband signal according to whether the second quadrature modulator is turned on. Optionally, in any of the preceding aspects, another implementation of the aspect provides that the device further includes: a carrier clock generator including a first portion and a second portion, the first portion of the carrier clock generator configured to generate a first carrier clock signal having a first output frequency when the second quadrature modulator is turned on, the second portion of the carrier clock generator configured to generate a second carrier clock signal having a second output frequency when the second quadrature modulator is turned off.

According to one aspect of the present disclosure, there is provided a method that includes: receiving a parameter for a transmission, the parameter including a current resource block configuration of the transmission, a current transmission power of the transmission, and an operating band of the transmission; determining a threshold transmission power according to an operating band of the transmission; turning on a first quadrature modulator of the transmitter and refraining from turning on a second quadrature modulator of the transmitter, in response to the current resource block configuration being in the center of a channel for the transmission; and turning on the first quadrature modulator and the second quadrature modulator of the transmitter, in response to the current transmission power being greater than the threshold transmission power.

Optionally, in any of the preceding aspects, another implementation of the aspect provides that the method further includes: turning on the second quadrature modulator of the transmitter in response to the current resource block configuration being at the edge of the channel for the transmission. Optionally, in any of the preceding aspects, another implementation of the aspect provides that determining the threshold transmission power includes: looking up the threshold transmission power in a lookup table according to the operating band of the transmission. Optionally, in any of the preceding aspects, another implementation of the aspect provides that turning on the second quadrature modulator includes: turning on a filter and a digital-to-analog converter of the second quadrature modulator. Optionally, in any of the preceding aspects, another implementation of the aspect provides that refraining from turning on the second quadrature modulator includes: turning off a filter and a digital-to-analog converter of the second quadrature modulator.

According to one aspect of the present disclosure, there is provided a system that includes: a transmitter including a first quadrature modulator and a second quadrature modulator, the first quadrature modulator configured to receive a first portion of a baseband signal, the second quadrature modulator configured to receive a second portion of the baseband signal, the transmitter configured to receive a control signal, and to control power to turn the second quadrature modulator on and off according to the control signal, the first quadrature modulator remaining on when controlling the power to the second quadrature modulator; and a processor configured to determine a configuration of a transmission, to produce the control signal according to the configuration, and to send the baseband signal and the control signal to the transmitter.

Optionally, in any of the preceding aspects, another implementation of the aspect provides that the configuration includes a current resource block configuration of the transmission, and the transmitter is configured to turn the second quadrature modulator on response to the current resource block configuration being in the center of a channel for the transmission. Optionally, in any of the preceding aspects, another implementation of the aspect provides that the configuration includes a current transmission power of the transmission, and the transmitter is configured to turn the second quadrature modulator on response to the current transmission power exceeding a predetermined threshold. Optionally, in any of the preceding aspects, another implementation of the aspect provides that the configuration includes an operating band of the transmission, and the predetermined threshold is selected from a plurality of predetermined thresholds according to the operating band.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Figure 1:
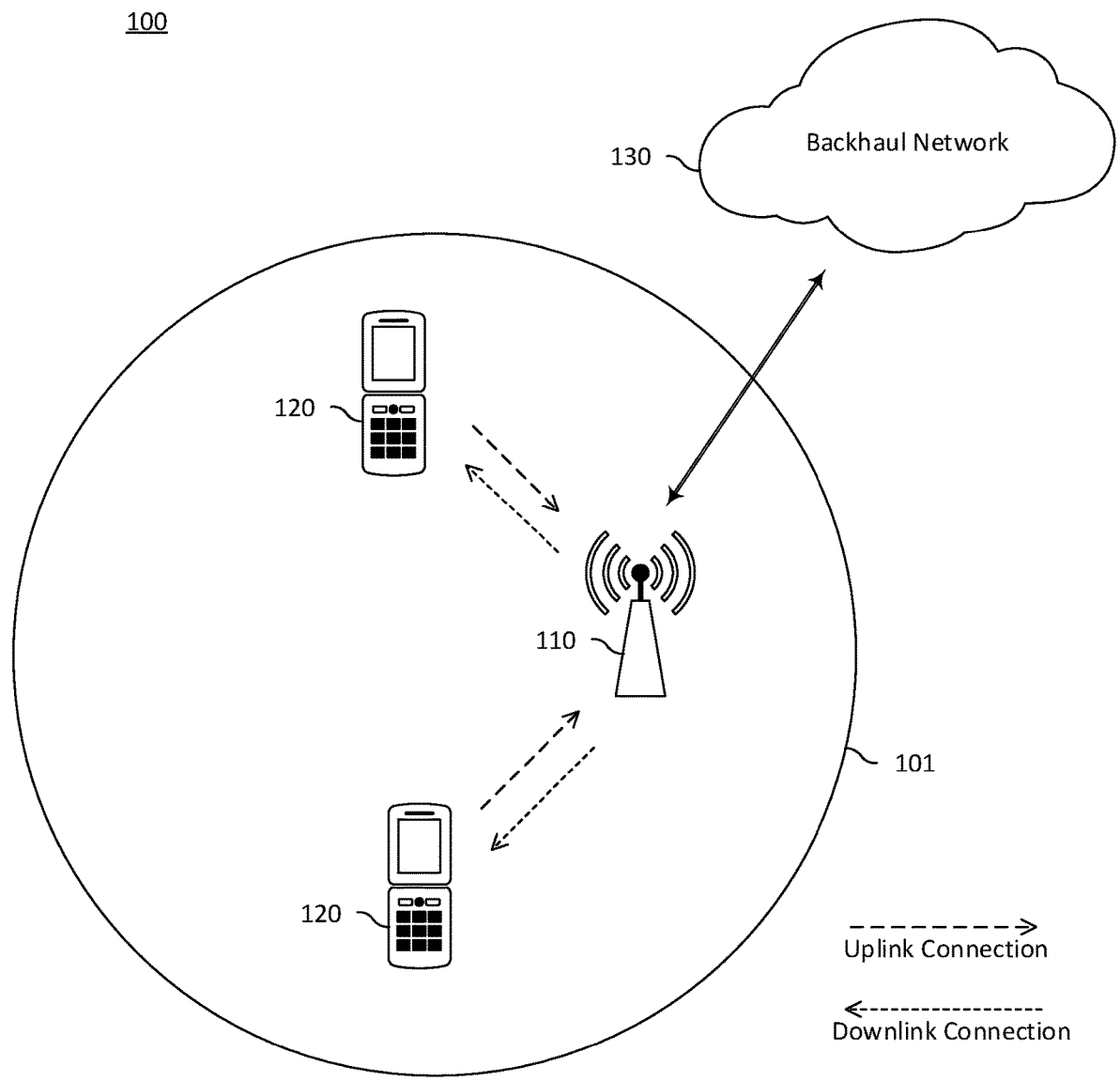
FIG. 1 is a diagram of a network for communicating data, in accordance with some embodiments.

FIG. 1 is a diagram of a network 100 for communicating data. The network 100 comprises a base station no having a coverage area 101, a plurality of mobile devices 120, and a backhaul network 130. As shown, the base station no establishes uplink (dashed line) and/or downlink (dotted line) connections with the mobile devices 120, which serve to carry data from the mobile devices 120 to the base station no and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

According to some embodiments, one or more of the mobile devices 120 use a hybrid transmitter for performing transmissions. A hybrid transmitter may be a multi-phase transmitter structure that operates in multiple ("hybrid") modes. The hybrid transmitter may be controlled to operate as an 8-Phase transmitter or a 4-Phase transmitter. When operating as an 8-Phase transmitter, the hybrid transmitter consumes more power but may also achieve high linearity performance. When operating as a 4-Phase transmitter, the hybrid transmitter consumes less power. 4-Phase operation may be performed in situations where linearity requirements are relaxed, and 8-Phase operation may be performed in situations where high linearity is needed. Linearity requirements for a transmission may be determined according to the resource block (RB) and/or channel configuration for the transmission. By reducing power consumption when linearity requirements are relaxed, the average power consumption of the transmitter may be reduced while still satisfying CIM requirements. By reducing power consumption, the battery life of the mobile device 120 may be increased.

Figure 2:
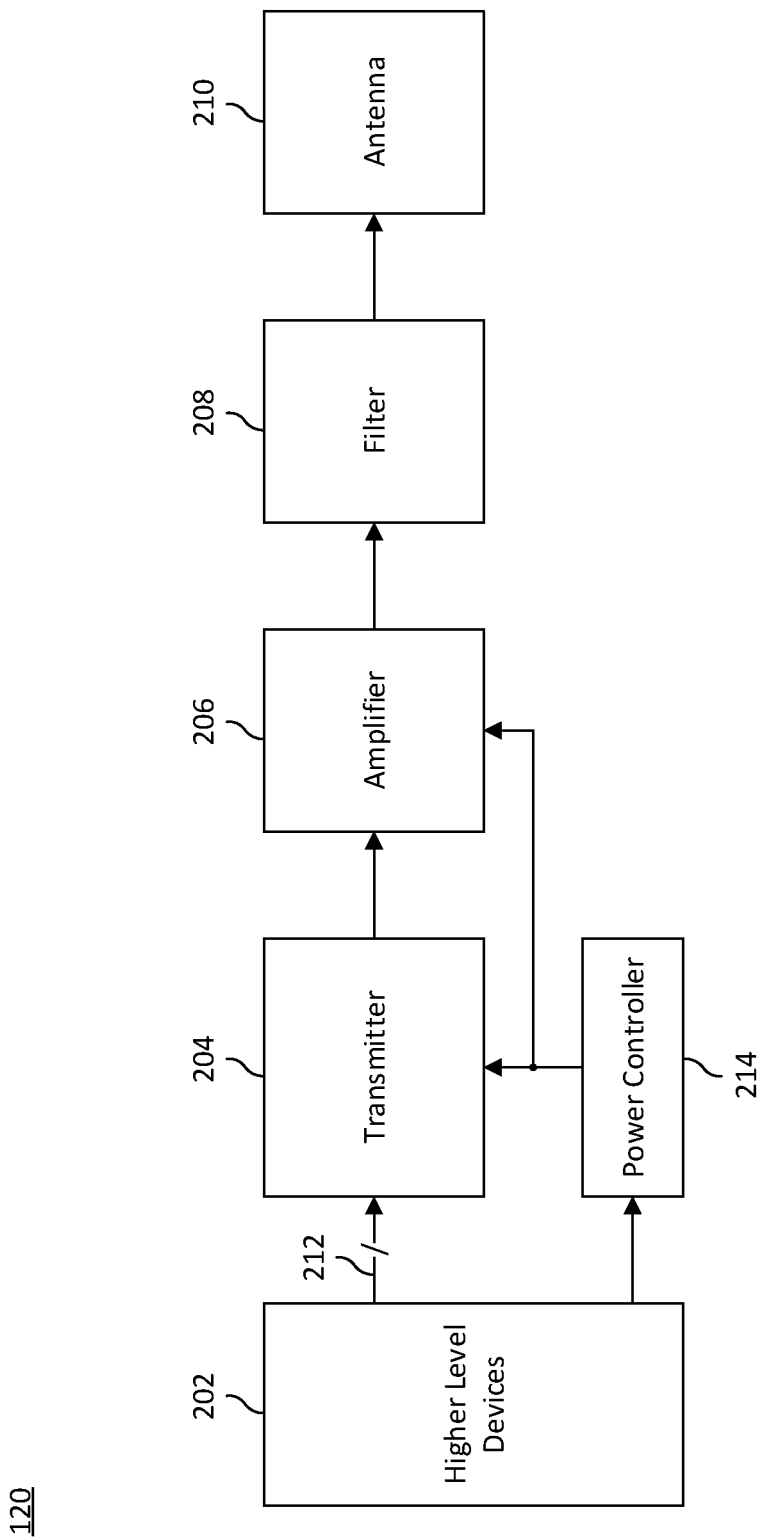
FIG. 2 is a block diagram of portions of a mobile device, in accordance with some embodiments.

FIG. 2 is a block diagram of portions of a mobile device 120, in accordance with some embodiments. The illustrated portions of the mobile device 120 include a baseband integrated circuit (IC) 202, a transmitter 204, one or more amplifiers 206, one or more filters 208, one or more antennas 210, and a power controller 214. The baseband IC 202 includes processors, memories, and the like, which may be executing firmware or software. For example, the baseband IC 202 may include general-purpose processors, field programmable gate arrays (FPGAs), application-specific integrated circuits (ASICs), or the like. In an embodiment, the baseband IC 202 comprises a baseband processor that generates outgoing signals for transmission and communicates the outgoing signals to the transmitter 204 using one or more signals 212. The signals 212 may include control signals and the outgoing signals, and are inputted to the transmitter 204 as baseband signals. The outgoing signals inputted to the transmitter 204 are represented by quadrature signals that include an in-phase portion (I) and a quadrature portion (Q).

The transmitter 204 generates an output signal for transmission according to the outgoing baseband signal. The transmitter 204 also includes front-end output circuitry, such as summers and a variable gain amplifier (VGA), for producing an upconverted radio frequency (RF) signal. The output signal is then amplified by the amplifiers 206. The amplifiers 206 may include a power amplifier (PA) or the like, and may be part of the transmitter 204 or may be separate from the transmitter 204. In an embodiment, the amplifiers 206 include a PA that is separate from the transmitter 204. Once amplified, the filters 208 may optionally be used to remove noise from the output signal. Finally, the output signal is transmitted using the antennas 210. During operation, the power controller 214 performs transmission power control for the transmitter 204 and amplifier 206. Parameters for a transmission, such as the current frequency band, the target antenna power, and the current LTE RB configuration, are communicated to the power controller 214, which performs transmission power control based on the communicated parameters. Although the power controller 214 is separately illustrate, it should be appreciated that, in some embodiments, the power controller 214 is part of the baseband integrated circuit (IC) 202.

In accordance with some embodiments, the transmitter 204 is a hybrid transmitter that may be configured for 4-Phase or 8-Phase operation by the power controller 214 in conjunction with a mode selection circuit 330 (see FIG. 3, discussed further below), according to control signals from the power controller 214. In an embodiment, the transmitter 204 is an 8-Phase transmitter that may be configured to implement 4-Phase operation. Particular features (or devices) of the 8-Phase transmitter may be powered off such that the features (or devices) remaining powered on form a 4-Phase transmitter. The operating mode of the transmitter 204 may be controlled based on several factors. In accordance with some embodiments, the power controller 214 receives parameters of a transmission, which may include the current frequency band, the target antenna power, and the current LTE RB configurations of a transmission that will be performed by the transmitter 204. The power controller 214 determines whether the transmitter 204 should operate in 4-Phase or 8-Phase operation according to the transmission parameters. An embodiment method for determining the mode of operation is described further below with respect to FIG. 5. Once the mode is determined, the power controller 214 sends the control signals to the mode selection circuit 330, which configures the transmitter 204 to operate in the selected mode.

The transmitter 204 may be controlled by the power controller 214 to comply with CIM requirements. CIM requirements may be imposed on the mobile devices 120 to limit spurious emissions to nearby mobile devices 120 operating at close frequencies. Spurious emission limits are often defined as an absolute level (e.g., in dBm). Spurious emissions may depend on the output power of the transmitter 204. CIM requirements may vary based on the output power, such that higher output powers have higher CIM requirements. From the perspective of the transmitter 204, achieving a target spurious emission level (e.g., in dBc) between the desired signal and unwanted spurious outputs is more difficult at high output power levels and easier at low output power levels. In other words, maintaining sufficiently low spurious emissions is easier at lower power levels. As such, in accordance with some embodiments, the operating mode of the transmitter 204 may be changed while performing transmitter automatic power control (TX APC) for the transmitter 204, which may be performed by the power controller 214 during operation (e.g., on-the-fly) based on the target transmission power for the antenna 210. In particular, a predetermined threshold is determined by the power controller 214 based on the transmission parameters, and is compared to current target transmission power for the antenna 210. When the current target antenna power is higher than the predetermined threshold, 8-Phase operation is enabled. When the current target antenna power is less than or equal to the predetermined threshold, 4-Phase operation is enabled. A main cause of CIM distortion is mixing of fundamental signals with third or fifth harmonics of the signals. An 8-Phase transmitter cancels the third and fifth harmonics, and a 4-Phase transmitter does not. As such, 8-Phase operation may provide better CIM performance, but may do so at the cost of higher power consumption.

The transmitter 204 may also be controlled by the power controller 214 according to the operating frequency used. CIM performance is frequency band dependent (depending on the protection needed for nearby frequency band), and so the mode of the transmitter 204 may be switched at predefined switching point thresholds. As such, in accordance with some embodiments, the predetermined threshold for the current target antenna power is frequency-band-dependent. Different predetermined thresholds may be used by the power controller 214 in different frequency bands.

The transmitter 204 may also be controlled by the power controller 214 according to the LTE resource block configuration used for transmissions. Typically more stringent CIM requirements are only applied to certain LTE RBs, such as RBs at edges of the frequency channel. RBs located at the edge of the frequency channel tend to be concentrated in a narrow bandwidth (e.g., have a higher energy density), and such RBs may cause greater CIM distortion than RBs that are more evenly spread across the frequency channel. For other cases, CIM requirements may be relaxed. Such cases include those where a full RB is used, or when a partial RB in the center of the channel is used. In such cases, 4-Phase operation may be used while maintaining CIM compliance. RB configuration information is made available to transmitter 204 by, e.g., the baseband IC 202, and may be used for mode selection to further optimize power consumption.

Figure 3:
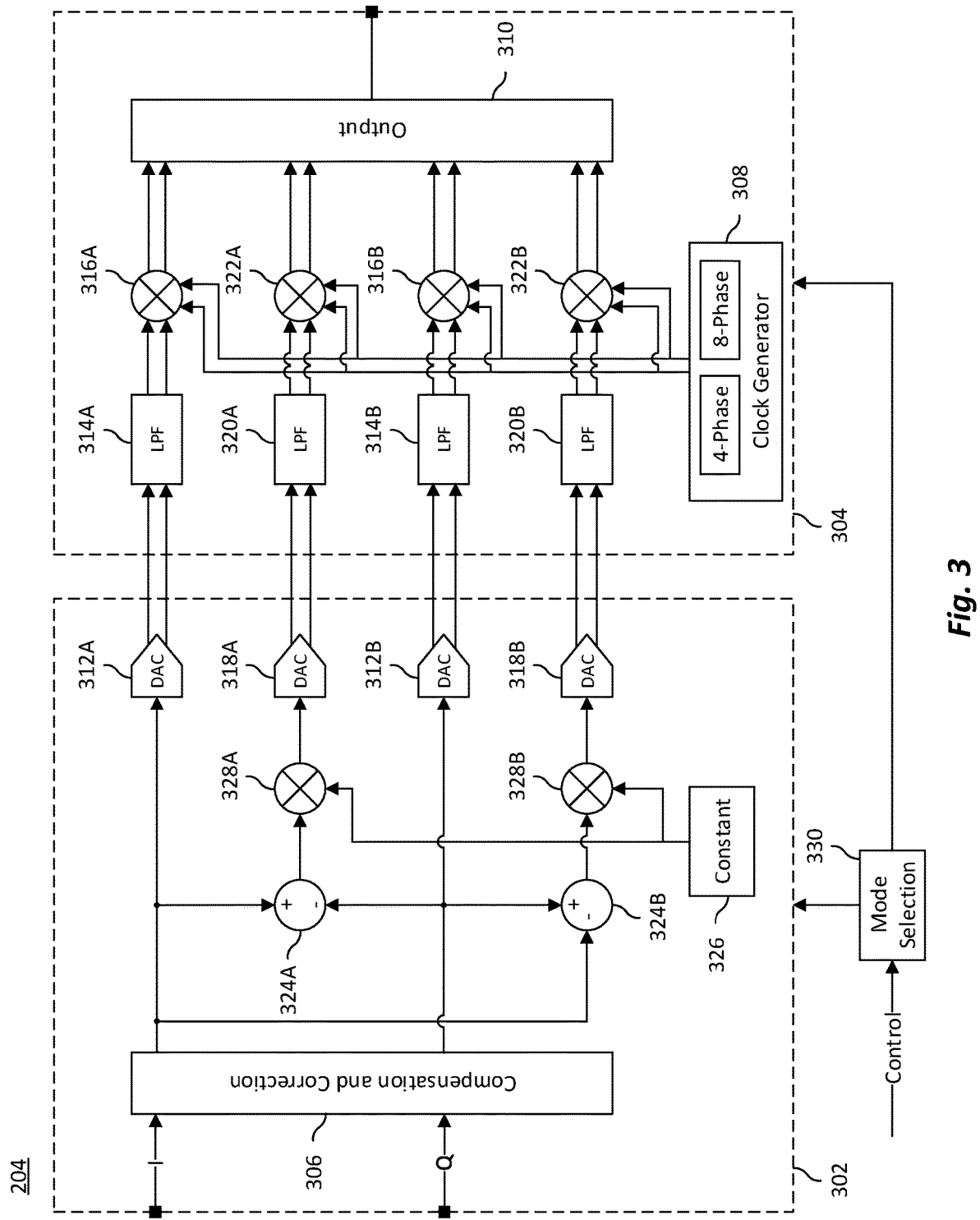
FIG. 3 is a system diagram of a transmitter, in accordance with some embodiments.

FIG. 3 is a system diagram of the transmitter 204, in accordance with some embodiments. The transmitter 204 has a digital baseband portion 302 and an analog transceiver portion 304. The digital baseband portion 302 is realized as software, firmware, an ASIC, or the like, and the analog transceiver portion 304 is realized as a circuit. The connections in the analog transceiver portion 304 are balanced pairs of signals. The transmitter 204 includes a plurality of quadrature modulators, which produce the output signal according to the I and Q components of the outgoing baseband signal. In particular, the transmitter 204 includes a first quadrature modulator and a second quadrature modulator. As further discussed below, the I and Q components may be digitally processed by a signal compensation and correction module 306 before they are modulated by the first and second quadrature modulators. The first and second quadrature modulators modulate the I and Q components with a carrier signal from a carrier clock generator 308, which is also discussed further below. The resulting signals are then combined by an output circuit 310. The output circuit 310 includes additional RF circuitry, such as summers for combining the signals from the first and second quadrature modulators to produce the output signal, and a VGA for amplifying the output signal. In some embodiments, the output circuit 310 is a VGA, where the output of the mixers 316A-316B and 322A-322B are directly connected to the VGA input. Because the output of the mixers 316A-316B and 322A-322B do not overlap, they may be directly connected without the need for a summer. The output of the VGA may be transmitted to the antenna 210.

The first quadrature modulator includes digital-to-analog converters (DACs) 312A-312B, low-pass filters (LPFs) 314A-314B, and mixers 316A-316B. The DACs 312A-312B, respectively, receive the I and Q signals in digital form and each produce a corresponding balanced pair of signals. The LPFs 314A-314B remove noise from the balanced analog I and Q signals. The mixers 316A-316B multiply the analog I and Q signals with the carrier signal. The carrier signal provided to the mixers 316A-316B is a quadrature signal, such that the signal provided to the mixer 316A is 90° out of phase with the signal provided to the mixer 316B. The resulting signals are then combined in the output circuit 310.

The second quadrature modulator includes DACs 318A-318B, LPFs 320A-320B, and mixers 322A-322B. The DACs 318A-318B, respectively, receive modified I and Q signals in digital form and each produce a corresponding balanced pair of signals. The modified I signal is produced by determining the difference between the I and Q signals at a summer 324A, and multiplying the difference by a constant 326 at the mixer 328A. The modified Q signal is produced by determining the difference between the Q and I signals at a summer 324B, and multiplying the difference by the constant 326 at the mixer 328B. The constant 326 is a predetermined value that, when multiplied by the difference between the I and Q signals, allows the second quadrature modulator to output the same signal level as the first quadrature modulator. The constant 326 may be, e.g., $1/\sqrt{2}$. The LPFs 320A-320B remove noise from the balanced analog modified I and Q signals. The mixers 322A-322B multiply the analog modified I and Q signals with the carrier signal. The carrier clock provided to the mixers 322A-322B is a quadrature signal, such that the signal provided to the mixer 322A is 90° out of phase with the signal provided to the mixer 322B. The resulting signals are then combined in the output circuit 310. Combining the differences between the I and Q signals (e.g., from the second quadrature modulator) with the I and Q signals (e.g., from the first quadrature modulator) results in cancellation of the third or fifth harmonics of the fundamental I and Q signals, reducing CIM distortion.

The carrier clock generator 308 provides clock signals for the first and second quadrature modulators, and may provide up to eight signals: two signals to each of the mixers 316A-316B and 322A-322B. As such, the carrier clock generator 308 may be said to be operating in 8-Phase mode when both the first and second quadrature modulators are active, and in 4-Phase mode when only the first quadrature modulator is active. The carrier clock generator 308 includes a first portion that provides clock signals in 4-Phase operation and a second portion that provides clock signals in 8-Phase operation. Power consumption of the carrier clock generator 308 may be reduced when it operates in 4-Phase mode.

During operation, a mode selection circuit 330 turns features of the transmitter 204 on and off to seamlessly switch between 4-Phase and 8-Phase operation. The mode selection circuit 330 changes modes of the transmitter 204 based on a control signal received from the baseband IC 202 (e.g., with the signals 212 via the power controller 214). When the mode selection circuit 330 receives the control signal, it controls the digital baseband portion 302 and analog transceiver portion 304 accordingly. The mode selection circuit 330 may be a demultiplexer, a microcontroller, a series of logic gates, or the like, which turn features of the transmitter 204 on or off depending on the control signal. If the transmitter should operate in 8-Phase mode, the functions of the digital baseband portion 302 are controlled to operate in 8-Phase mode, all the modulators and associated circuits of the analog transceiver portion 304 are turned on, and the carrier clock generator 308 is controlled to produce 8-Phase clock signals. If the transmitter should operate in 4-Phase mode, the functions of the digital baseband portion 302 are controlled to operate in 4-Phase mode, the second quadrature modulator and associated circuits of the analog transceiver portion 304 are turned off, and the carrier clock generator 308 is controlled to produce 4-Phase clock signals.

The compensation and correction module 306 corrects the I and Q outgoing baseband signals before they are transmitted. Among other correction operations, the compensation and correction module 306 may perform phase compensation and impairment correction. Parameters of the phase compensation and impairment correction operations may be changed by the mode selection circuit 330 according to the operating mode of the transmitter 204.

For impairment correction, 8-Phase operation and 4-Phase operation may call for different impairment correction values. Examples of impairment correction include image distortion correction, DC offset correction, correction of signal leakage from the carrier clock generator 308, and the like. The correction values used may be selected according to the mode of operation. Different impairment correction values for 8-Phase operation and 4-Phase operation may be stored in the compensation and correction module 306, and the appropriate impairment correction values may be selected based on the mode of operation. Image distortion correction may be implemented as two tap filters, where the impairment correction values are the tap filter coefficients. Image distortion correction may also be implemented as a multiplier with a delay adjustment, where the impairment correction values are the multiplier and delay values. The DC offset correction may be implemented through addition of a DC value, where an impairment correction value is the added DC value.

For phase compensation, transitioning between 8-Phase and 4-Phase operation may cause a phase shift from the carrier clock generator 308. The carrier clock generator 308 circuit produces a constant phase shift between 8-Phase and 4-Phase operation. A constant phase shift may be added to the outgoing baseband signals to compensate for the phase shift introduced by the carrier clock generator 308, as well as other phase shifts introduced by other circuit in the transmission path of the transmitter 204. The phase shift compensation value used may be selected according to the mode of operation. Different phase compensation values for 8-Phase operation and 4-Phase operation may be stored in the compensation and correction module 306, and the appropriate phase compensation values may be selected based on the mode of operation.

Figure 4A:
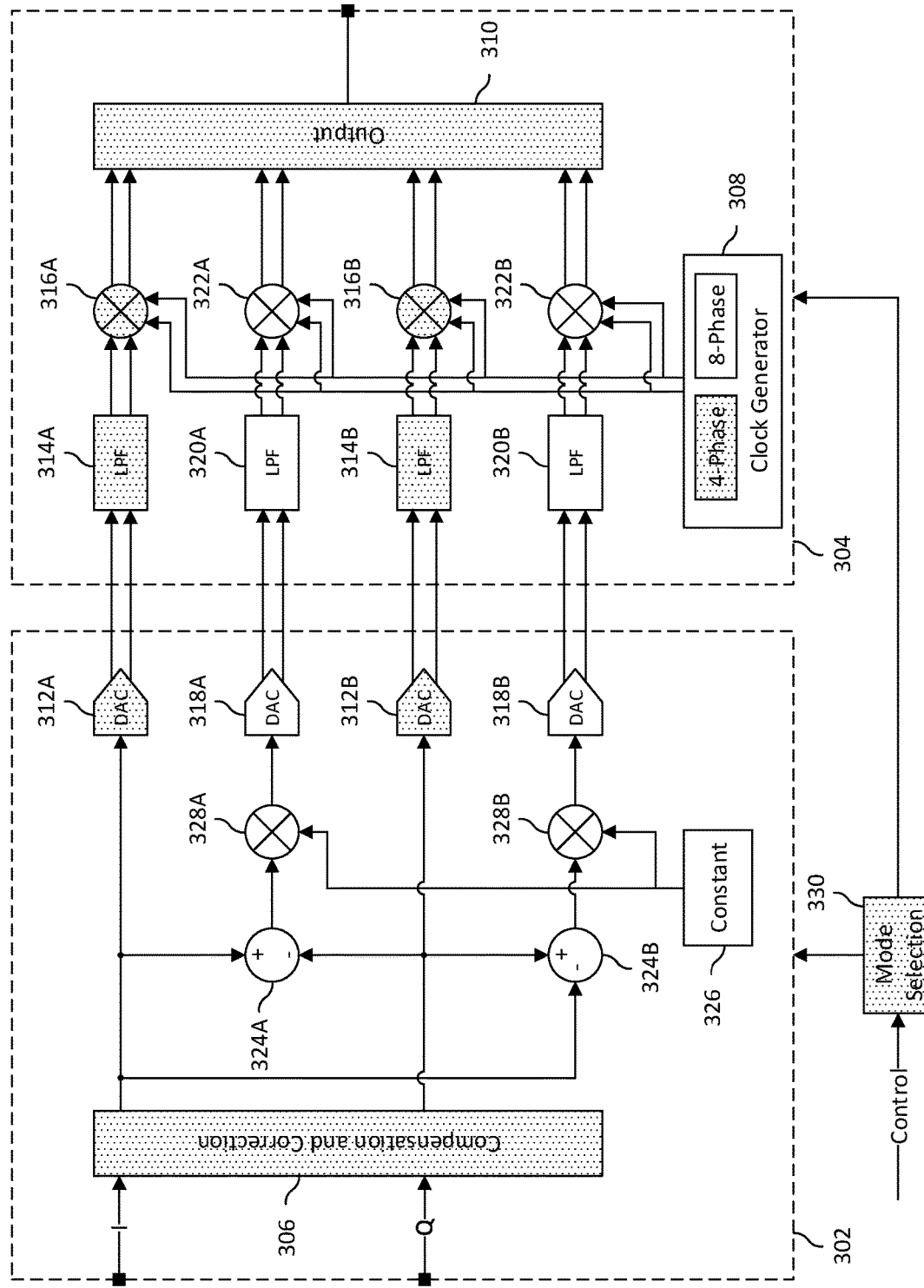
FIGS. 4A and 4B show a transmitter during operation, in accordance with some embodiments.
Figure 4B:
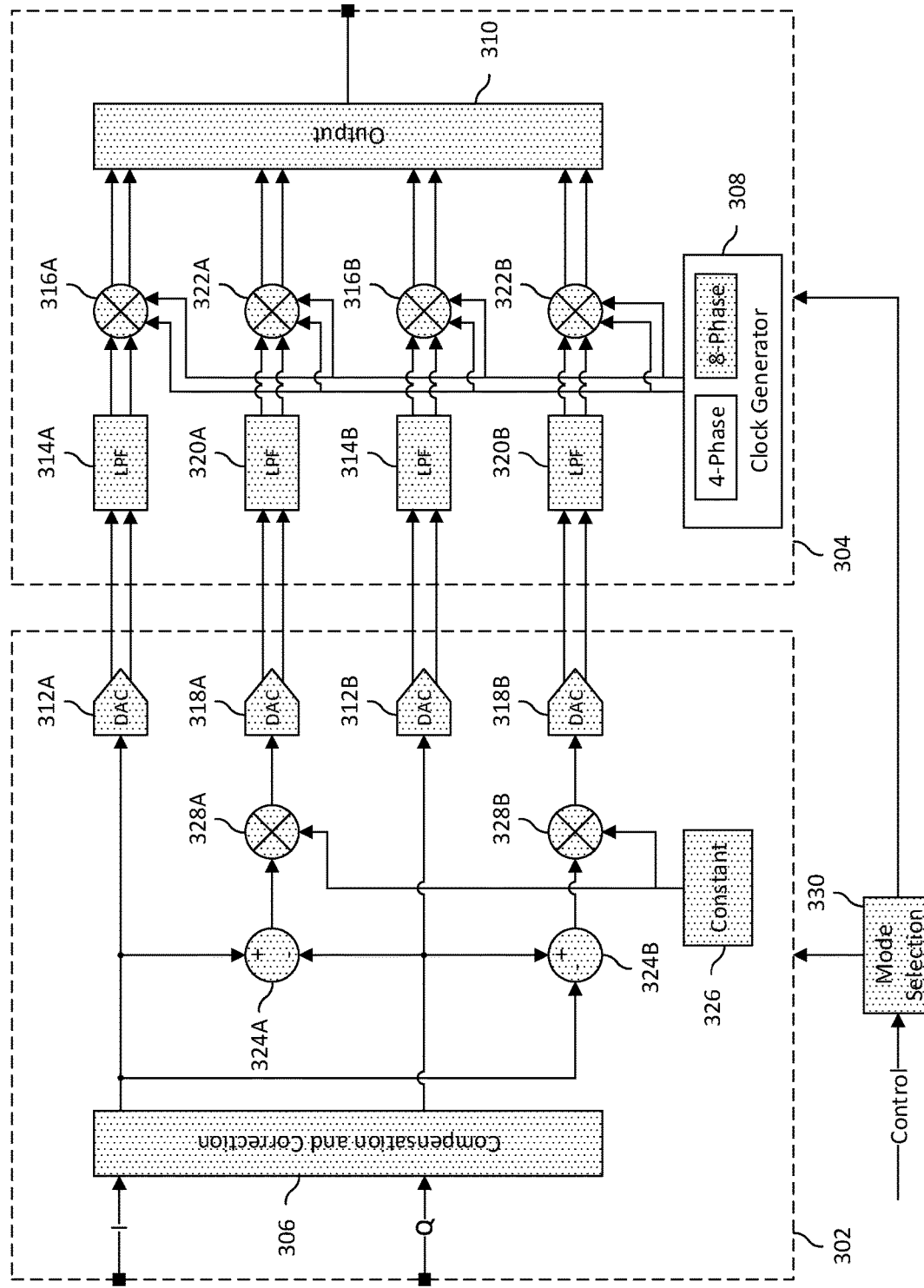

FIGS. 4A and 4B show the transmitter 204 during operation, in accordance with some embodiments. In FIG. 4A, the first quadrature modulator and related circuits/functions are enabled and the second quadrature modulator and related circuits/functions are not turned on, such that the transmitter 204 is in 4-Phase operation. Enabling the first quadrature modulator includes turning on power to the components of the first quadrature modulator (indicated in the figure by hashing) and related circuits/functions, and turning off or refraining from turning on the second quadrature modulator includes turning off power to the components of the second quadrature modulator and related circuits/functions. In FIG. 4B, the first and second quadrature modulators and related circuits/functions are enabled, such that the transmitter 204 is in 8-Phase operation. Enabling the first and second quadrature modulators includes turning on power to the components of the first and second quadrature modulators (indicated in the figure by hashing) and related circuits/functions.

Figure 5:
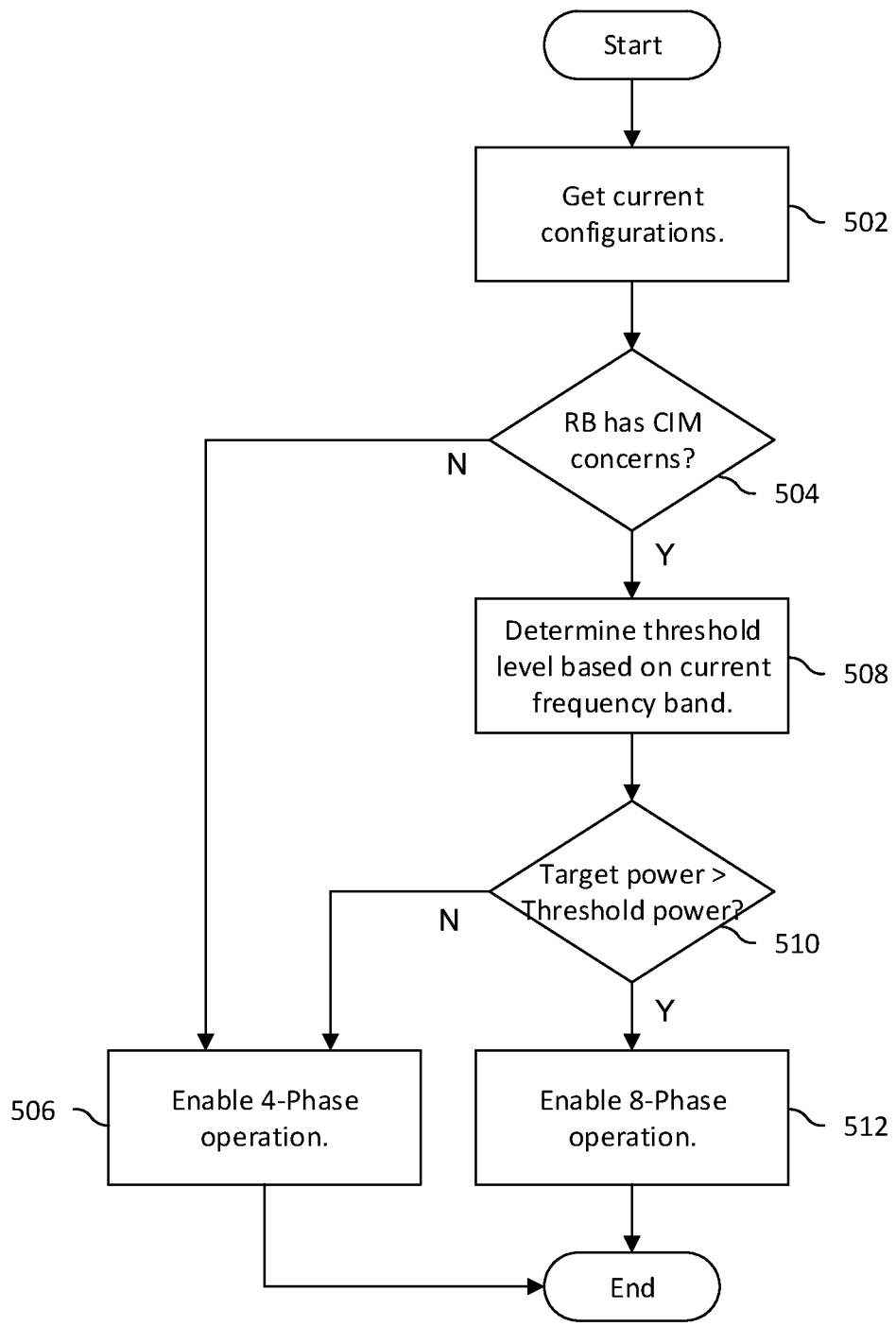
FIG. 5 is a flow diagram of a method for controlling spurious emission of a mobile device, in accordance with some embodiments.

FIG. 5 is a flow diagram of a method 500 for controlling spurious emission of a mobile device 120, in accordance with some embodiments. The method 500 may be performed during operation, such as when controlling the transmitter 204 to perform a transmission. For example, the method 500 may be performed by the power controller 214. The transmitter 204 is controlled according to CIM requirements. The current transmission parameters are obtained (step 502). The transmission parameters include the current frequency band, the target antenna power, and the current LTE RB configurations. When the current RB configuration does not raise CIM concerns (step 504), the mode is switch to 4-Phase operation to save power (step 506). 4-Phase operation is enabled by turning on the first quadrature modulator and related circuits/functions and turning off the second quadrature modulator and related circuits/functions. Conversely, when the current RB configuration raises CIM concerns, further inquiry is performed to determine the operating mode. The current threshold operating level is determined based on the current frequency band (step 508). The current threshold may be determined based on a threshold lookup table indexed by the current frequency band. When the configured target antenna power exceeds the current threshold (step 510), the mode is switch to 8-Phase operation to achieve high CIM performance (step 512). When the configured target antenna power is less than or equal to the current threshold, 4-Phase operation is used.

Figure 6:
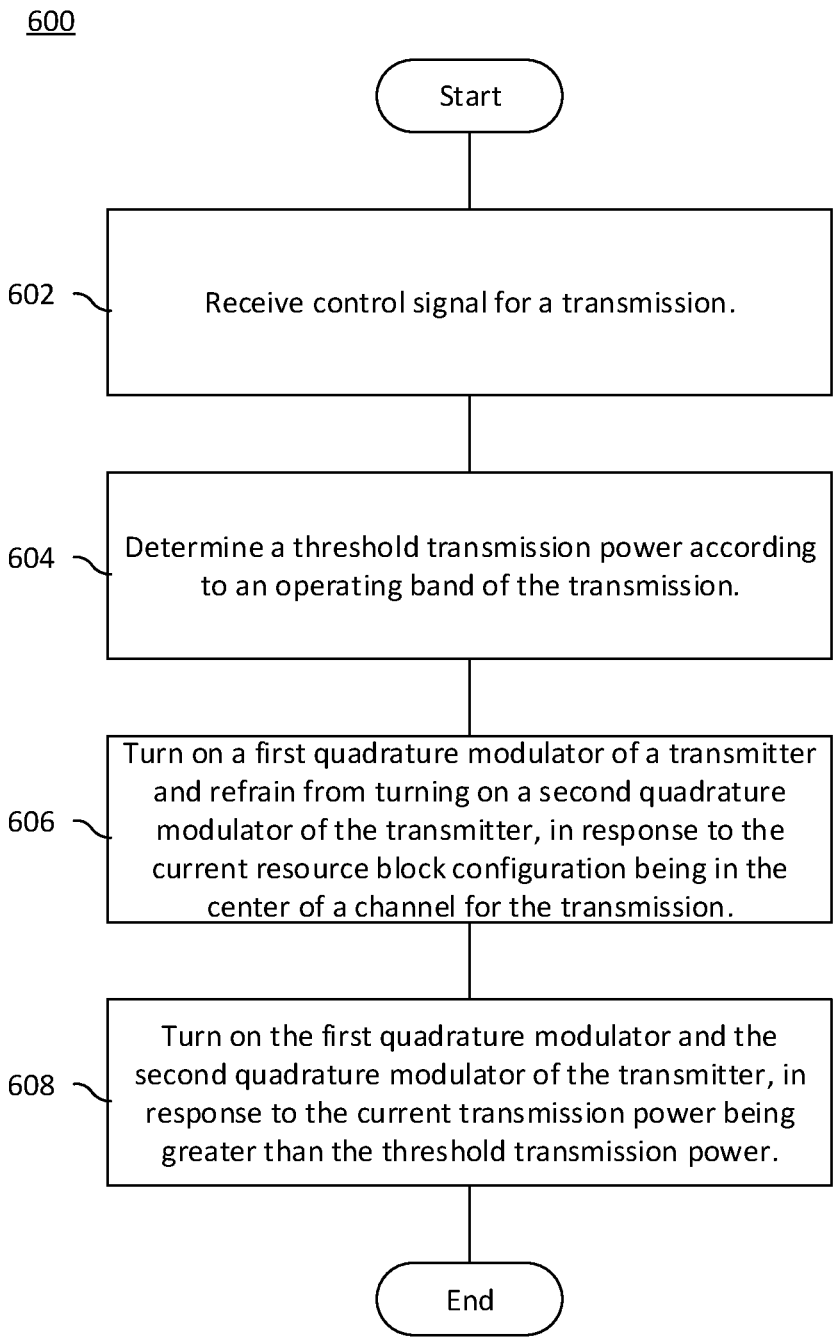
FIG. 6 is a flow diagram of a method for controlling spurious emission of a mobile device, in accordance with some embodiments.

FIG. 6 is a flow diagram of a method 600 for controlling spurious emission of a mobile device 120, in accordance with some embodiments. The method 600 may be performed when controlling the transmitter 204 to perform a transmission. For example, the method 600 may be performed by the power controller 214. In step 602, parameters for a transmission are received. The transmission parameters include a current resource block configuration of a transmission to be performed by the transmitter 204, a current transmission power of the transmission, and an operating band of the transmission. In step 604, a threshold transmission power is determined according to an operating band of the transmission. In step 606, a first quadrature modulator of the transmitter 204 is turned on. A second quadrature modulator of the transmitter 204 is refrained from being turned on, in response to the current resource block configuration being in the center of a channel for the transmission. In step 608, the first and second quadrature modulators of the transmitter 204 are turned on, in response to the current transmission power being greater than the threshold transmission power.

Figure 7:
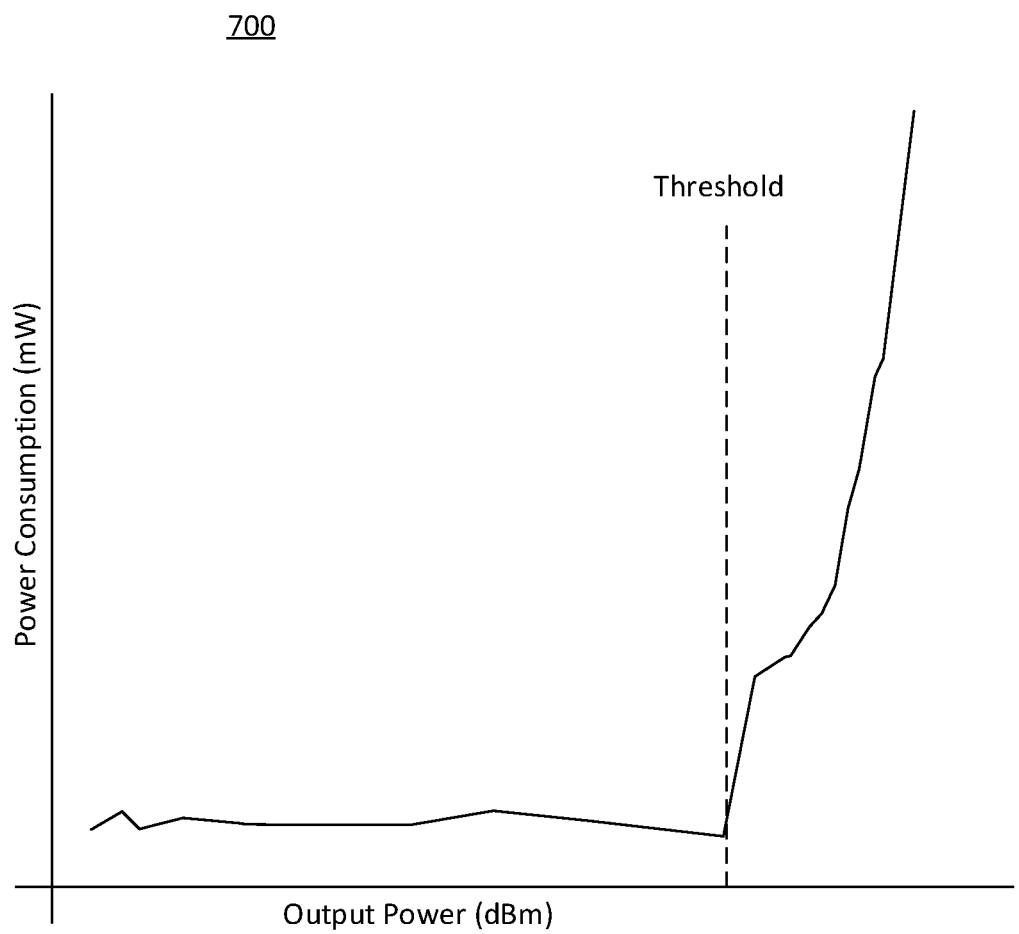
FIG. 7 is a chart showing power consumption of a transmitter, in accordance with some embodiments.

FIG. 7 is a chart 700 showing power consumption of the transmitter 204 as a function of transmission output power. The chart 700 is a plot of experimentally collected test data. As can be seen, 4-Phase operation is used at lower transmission output powers, greatly reducing power consumption. As transmission output power is increased, 8-Phase operation is used. Power consumption is increased, however, using 8-Phase operation may achieve sufficient CIM performance. On average, power consumption of a hybrid transmitter is 25% lower than an 8-Phase transmitter.

Figure 8:
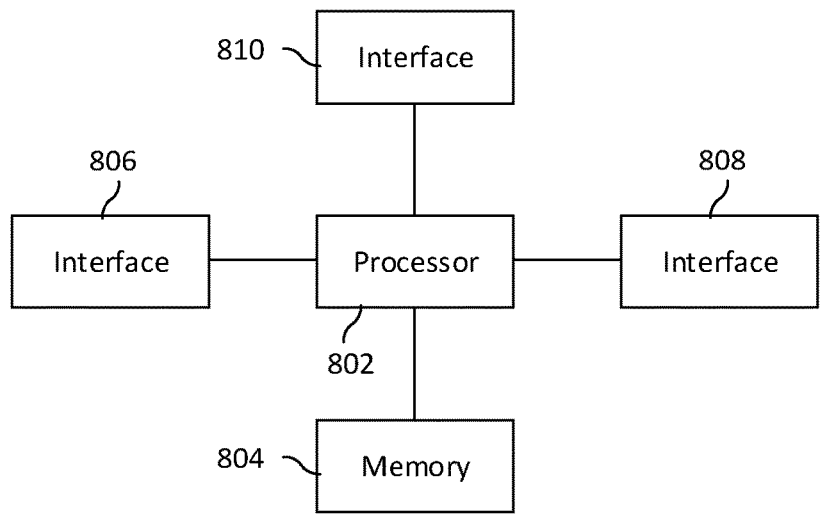
FIG. 8 is a block diagram of a processing system, in accordance with some embodiments.

FIG. 8 is a block diagram of a processing system 800 for performing methods described herein, which may be installed in a host device. As shown, the processing system 800 includes a processor 802, a memory 804, and interfaces 806-810, which may (or may not) be arranged as shown in FIG. 8. The processor 802 may be any component or collection of components adapted to perform computations and/or other processing related tasks, and the memory 804 may be any component or collection of components adapted to store programming and/or instructions for execution by the processor 802. In an embodiment, the memory 804 includes a non-transitory computer readable medium. The interfaces 806, 808, 810 may be any component or collection of components that allow the processing system 800 to communicate with other devices/components and/or a user. For example, one or more of the interfaces 806, 808, 810 may be adapted to communicate data, control, or management messages from the processor 802 to applications installed on the host device and/or a remote device. As another example, one or more of the interfaces 806, 808, 810 may be adapted to allow a user or user device (e.g., personal computer (PC), etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
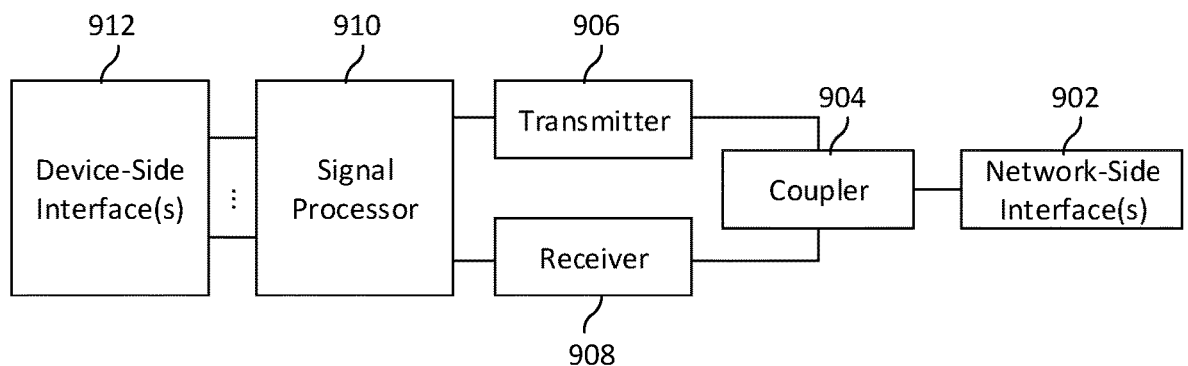
FIG. 9 is a block diagram of a transceiver, in accordance with some embodiments.

In some embodiments, one or more of the interfaces 806, 808, 810 connects the processing system 800 to a transceiver adapted to transmit and receive signaling over the telecommunications network. FIG. 9 is a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, an receiving unit/module, a summing unit/module, an enabling unit/module, a disabling unit/module, a producing unit/module, a refraining unit/module, a modifying unit/module, a generating unit/module, a transmitting unit/module, and/or a selecting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A device comprising:
   a transmitter comprising:
      a carrier clock generator configured to generate a carrier clock signal;
      a first quadrature modulator configured to receive an input quadrature signal, the first quadrature modulator comprising first mixers configured to multiply the input quadrature signal with the carrier clock signal to produce a first portion of an output signal;
      a second quadrature modulator configured to receive the input quadrature signal, and to modify the input quadrature signal to produce a modified quadrature signal, the second quadrature modulator comprising second mixers configured to multiply the modified quadrature signal with the carrier clock signal to produce a second portion of the output signal;
      an output circuit configured to sum the first portion of the output signal and the second portion of the output signal, and to transmit the output signal to an antenna; and
      a mode selection circuit configured to turn on the first quadrature modulator, to receive a control signal, to control the carrier clock generator according to the control signal, and to determine whether to turn on the second quadrature modulator according to the control signal.

2. The device of claim 1 further comprising:
   a controller coupled to the mode selection circuit, the controller configured to receive parameters of a transmission, and to produce the control signal according to the parameters of the transmission, wherein the parameters of the transmission comprise a current resource block configuration of the transmission, a current transmission power of the transmission, and an operating band of the transmission.

3. The device of claim 2, wherein the mode selection circuit is configured to:
   refrain from turning on the second quadrature modulator in response to the current resource block configuration being in the center of a channel for the transmission.

4. The device of claim 2, wherein the mode selection circuit is configured to:
   turn on the second quadrature modulator in response to the current resource block configuration being at the edge of a channel for the transmission.

5. The device of claim 2, wherein the mode selection circuit is configured to:
   determine a threshold transmission power according to the operating band of the transmission; and
   refrain from turning on the second quadrature modulator in response to the current transmission power of the transmission being less than or equal to the threshold transmission power.

6. The device of claim 5, wherein the mode selection circuit is configured to determine the threshold transmission power using a lookup table indexed by the operating band.

7. The device of claim 1, wherein the output circuit comprises an amplifier configured to amplify the output signal before transmission to the antenna.

8. The device of claim 1, wherein the transmitter further comprises:
a compensation and correction module configured to modify the input quadrature signal, the mode selection circuit configured to change parameters of the compensation and correction module according to the control signal.

9. The device of claim 8, wherein the mode selection circuit is configured to change phase compensation parameters of the compensation and correction module according to whether the second quadrature modulator is turned on.

10. The device of claim 8, wherein the mode selection circuit is configured to change impairment correction parameters of the compensation and correction module according to whether the second quadrature modulator is turned on.

11. The device of claim 1, wherein the carrier clock generator comprises:
a first portion configured to generate the carrier clock signal with a first output frequency when the second quadrature modulator is turned on; and
a second portion configured to generate the carrier clock signal with a second output frequency when the second quadrature modulator is turned off.

12. A method comprising:
receiving a parameter for a transmission, the parameter comprising a current resource block configuration of the transmission, a current transmission power of the transmission, and an operating band of the transmission;
determining a threshold transmission power according to the operating band of the transmission;
turning on a first quadrature modulator of a transmitter;
in response to the current resource block configuration being in the center of a channel for the transmission:
refraining from turning on a second quadrature modulator of the transmitter; and
providing a carrier clock signal at a first output frequency to the first quadrature modulator;
in response to the current transmission power being greater than the threshold transmission power:
turning on the second quadrature modulator of the transmitter; and
providing the carrier clock signal at a second output frequency to the first quadrature modulator and the second quadrature modulator, the second output frequency being different from the first output frequency.

13. The method of claim 12, further comprising:
turning on the second quadrature modulator of the transmitter in response to the current resource block configuration being at the edge of the channel for the transmission.

14. The method of claim 12, wherein determining the threshold transmission power comprises:
looking up the threshold transmission power in a lookup table according to the operating band of the transmission.

15. The method of claim 12, wherein turning on the second quadrature modulator of the transmitter comprises:
turning on a mixer and a digital-to-analog converter of the second quadrature modulator.

16. The method of claim 12, wherein refraining from turning on the second quadrature modulator of the transmitter comprises:
turning off a mixer and a digital-to-analog converter of the second quadrature modulator.

17. A system comprising:
a transmitter comprising a first quadrature modulator and a second quadrature modulator, the first quadrature modulator configured to receive an input quadrature signal and to generate a first portion of an output signal, the second quadrature modulator configured to receive the input quadrature signal and to generate a second portion of the output signal; and
a controller coupled to the transmitter, the controller configured to determine a configuration of a transmission and to control power to turn the second quadrature modulator on or off according to the configuration of the transmission, the first quadrature modulator remaining on when controlling the power to the second quadrature modulator.

18. The system of claim 17, wherein the configuration includes a current resource block configuration of the transmission, and the controller is configured to turn the second quadrature modulator on response to the current resource block configuration being in the center of a channel for the transmission.

19. The system of claim 17, wherein the configuration includes a current transmission power of the transmission, and the controller is configured to turn the second quadrature modulator on response to the current transmission power exceeding a predetermined threshold.

20. The system of claim 19, wherein the configuration includes an operating band of the transmission, and the predetermined threshold is selected from a plurality of predetermined thresholds according to the operating band.

* * * * *